(12) United States Patent
Nasu et al.

(10) Patent No.: US 10,203,019 B2
(45) Date of Patent: Feb. 12, 2019

(54) DAMPER DEVICE

(71) Applicant: AISIN SEIKI KABUSHIKI KAISHA, Kariya-shi, Aichi (JP)

(72) Inventors: Tsuyoshi Nasu, Kariya (JP); Daisuke Hayashi, Kariya (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 185 days.

(21) Appl. No.: 15/127,690

(22) PCT Filed: Mar. 24, 2015

(86) PCT No.: PCT/JP2015/058875
§ 371 (c)(1),
(2) Date: Sep. 20, 2016

(87) PCT Pub. No.: WO2015/146968
PCT Pub. Date: Oct. 1, 2015

(65) Prior Publication Data
US 2018/0149231 A1     May 31, 2018

(30) Foreign Application Priority Data
Mar. 24, 2014   (JP) ................... 2014-060833

(51) Int. Cl.
*F16F 15/129* (2006.01)
*F16D 13/68* (2006.01)
(Continued)

(52) U.S. Cl.
CPC .......... *F16F 15/1292* (2013.01); *F16D 13/68* (2013.01); *F16F 15/129* (2013.01);
(Continued)

(58) Field of Classification Search
CPC ............. F16F 15/1292; F16F 15/13407; F16F 15/12353; F16F 15/167; F16D 13/68
(Continued)

(56) References Cited

U.S. PATENT DOCUMENTS 5,529,161 A    6/1996  Ament et al.
5,769,721 A    6/1998  Tauvron et al.
(Continued)

FOREIGN PATENT DOCUMENTS

DE    196 16 479 A1    11/1996
DE    199 50 081 B4     9/2008
(Continued)

OTHER PUBLICATIONS

International Search Report (PCT/ISA/210) dated Jun. 23, 2015, by the Japanese Patent Office as the International Searching Authority for International Application No. PCT/JP2015/058875 with English language translation (6 pages).
(Continued)

*Primary Examiner* — Greg Binda
(74) *Attorney, Agent, or Firm* — Buchanan Ingersoll & Rooney PC

(57) ABSTRACT

In a damper device according to an embodiment, a third member is configured to be rotatable about a rotation center, rotate integrally with a first member in a first section, and rotate integrally with a second member in a second section. A first friction member has a first friction face that generates a friction torque along with relative rotation of the first member and the second member, and a second friction member has a second friction face that generates a friction torque along with relative rotation of the second member and the third member.

5 Claims, 11 Drawing Sheets

(51) Int. Cl.
  *F16F 15/123* (2006.01)
  *F16F 15/134* (2006.01)
  *F16D 13/64* (2006.01)
  *F16F 15/167* (2006.01)
(52) U.S. Cl.
  CPC .. *F16F 15/12353* (2013.01); *F16F 15/13407* (2013.01); *F16D 13/64* (2013.01); *F16F 15/167* (2013.01)
(58) Field of Classification Search
  USPC ........... 464/68.41, 68.8; 192/213.12, 213.22, 192/213.31, 214.1
  See application file for complete search history.

(56) References Cited

U.S. PATENT DOCUMENTS

| | | | |
|---|---|---|---|
| 5,884,743 A | 3/1999 | Kleifges et al. | |
| 6,283,866 B1 | 9/2001 | Hashimoto et al. | |
| 6,857,514 B2 * | 2/2005 | Hashimoto | F16F 15/129 192/213.22 X |
| 2006/0102444 A1 | 5/2006 | Kitada | |
| 2007/0191120 A1 | 8/2007 | Saeki et al. | |

FOREIGN PATENT DOCUMENTS

| | | |
|---|---|---|
| GB | 2 343 234 A | 5/2000 |
| GB | 2 358 692 A | 8/2001 |
| JP | 2-136840 U | 11/1990 |
| JP | 2000-179572 A | 6/2000 |
| JP | 2002-181131 A | 6/2002 |
| JP | 2006-144861 A | 6/2006 |
| JP | 2007-218347 A | 8/2007 |

OTHER PUBLICATIONS

The extended European Search Report dated Mar. 6, 2017, by the European Patent Office in corresponding European Patent Application No. 15769106.4-1755. (8 pages).

International Search Report (PCT/ISA/210) dated Jun. 23, 2015, by the Japanese Patent Office as the International Searching Authority for International Application No. PCT/JP2015/058875.

Written Opinion (PCT/ISA/237) dated Jun. 23, 2015, by the Japanese Patent Office as the International Searching Authority for International Application No. PCT/JP2015/058875.

* cited by examiner

US 10,203,019 B2

DAMPER DEVICE

CROSS-REFERENCE TO RELATED APPLICATIONS

This application is national stage application of International Application No. PCT/JP2015/058875, filed Mar. 24, 2015, which designates the United States, incorporated herein by reference, and which claims the benefit of priority from Japanese Patent Application No. 2014-060833, filed Mar. 24, 2014, the entire contents of which are incorporated herein by reference.

TECHNICAL FIELD

An embodiment of the present invention relates to a damper device.

BACKGROUND ART

A damper device is conventionally known which includes a driving plate corresponding to a first member to rotate about a rotation center, a driven plate corresponding to a second member, and a resilient member and a friction member provided between the plates (e.g., see Patent Document 1).

CITATION LIST

Patent Literature

Patent Document 1: DE 19616479 A1

DISCLOSURE OF INVENTION

Problem to be Solved by the Invention

This type of damper device may include a section having lower friction torque and a section having higher friction torque according to a torsion angle of relative rotation of the driving plate and the driven plate. In such a configuration, a sudden change in the friction torque from the lower friction-torque section to the higher friction-torque section may cause an adverse event. For example, when mounted on a vehicle, a sudden change in the friction torque of such a damper device may unfavorably causes vibration, noise, or the like in the vehicle.

Means for Solving Problem

A damper device of an embodiment comprises, for example, a first member, a second member, a third member, a first resilient member, a first friction member, a second friction member. The first member is rotatable about a rotation center. The second member is rotatable about the rotation center. The third member is configured to be rotatable about the rotation center and integrally rotate with the first member in a first section and integrally rotate with the second member in a second section. The first resilient member resiliently expands and contracts along with relative rotation of the first member and the second member about the rotation center. The first friction member has a first friction face that generates a friction torque along with the relative rotation of the first member and the second member. The second friction member has a second friction face that generates a friction torque along with relative rotation of the second member and the third member. According to the damper device of the embodiment, the section with a higher friction torque can be divided into the first section and the second section having different friction torques, for example, by differently setting the magnitudes of the friction torque on the first friction face and on the second friction face. Thus, a sudden change in the torque during transition from the section having a lower friction torque to the section having a higher friction torque can be reduced to a gradual one, which results in inhibiting the occurrence of a disadvantageous event. For example, a vehicle to which such a damper device is applied can inhibit vibration, noise, or the like due to the sudden change in friction torque.

In the damper device according, for example, one of the first member and the third member is provided with a hook, and in the first section the hook circumferentially catches the other of the first member and the third member to integrally rotate the first member and the third member, and in the second section, the hook does not circumferentially catch the other of the first member and the third member, and the second member and the third member are integrally rotated by a frictional force between the second member and the third member. Thus, according to the damper device of the embodiment, for example, by use of the connection or non-connection between the hook and the other of the first and third members, that is, catching either the first member or the third member with the hook, the first and second sections can be attained with a simpler configuration.

The damper device further comprises, for example, a second resilient member that presses the second member and the third member onto the second friction face. Thus, according to the damper device of the embodiment, a frictional force of the second friction face can be generated with a second resilient member. According to the damper device of the embodiment, for example, the second member and the third member can slide or integrally rotate with each other by sliding resistance on the second friction face caused by the second resilient member.

In the damper device, for example, the first friction member further has a third friction face that generates a friction torque along with relative rotation of the second member and the third member. Thus, according to the damper device of the embodiment, for example, the third friction face of the first friction member provides sliding resistance, and the second member and the third member can be relatively rotated by the sliding resistance.

The damper device further comprises, for example, a second resilient member that presses the second member and the third member onto the second friction face, wherein the second resilient member further presses the second member and the third member onto the third friction face. Thus, according to the damper device of the embodiment, for example, the third friction face can increase the frictional force. According to the damper device of the embodiment, for example, the second resilient member can provide further effective sliding resistance.

A damper device of the embodiment comprises, for example, a first member rotatable about a rotation center; a second member rotatable about the rotation center; a third member configured to be rotatable about the rotation center and rotate integrally with the first member in a first section and rotate integrally with the second member in a second section; a fourth member configured to be rotatable about the rotation center relative to the integrally rotated first member, second member, and third member in a third section opposite to the first section across the second section; a first resilient member that resiliently expands and contracts along with relative rotation of the first member and the second member about the rotation center; a third resilient member that resiliently expands and contracts along with relative rotation of the second member and the fourth member about the rotation center; a first friction member having a first friction face that generates a friction torque with the relative rotation of the first member and the second member; a second friction member having a second friction face that generates a friction torque along with the relative rotation of the second member and the third member; and a third friction member having a fourth friction face that generates a friction torque with the relative rotation of the first member and the fourth member. Thus, according to the damper device of the embodiment, for example, differently setting the magnitudes of the friction torque on the first friction face, on the second friction face, and on the fourth friction face makes it possible to provide, between the third section with a lower friction torque and the first section with a higher friction torque, the second section with friction torque of a value between the two friction torques. Hence, for example, during transition from the first section having a lower friction torque to the third section having a higher friction torque, a sudden change in the friction torque can be inhibited.

BEST MODE(S) FOR CARRYING OUT THE INVENTION

An exemplary embodiment of the present invention is disclosed below. A configuration of the embodiment described below, and functions, results, and effects brought about by the configuration are exemplary only. The present invention can be also achieved by a configuration other than the configuration disclosed in the following embodiment. Further, according to the present invention, at least one of various effects obtained by the configuration can be obtained.

A damper device 100 according to the present embodiment is disposed for example between an engine as a power unit not illustrated and a transmission as a gear changer not illustrated. The damper device 100 can reduce variation in torque or rotation as a driving force. Note that the damper device 100 can be provided between two different rotation elements other than the engine and the transmission, for example, the engine and a motor generator, and can be provided in various vehicles such as hybrid cars or machines having a rotation element. In the following, axial direction represents an axial direction of a rotation center Ax, radial direction represents a radial direction of the rotation center Ax, and circumferential direction represents a circumferential direction of the rotation center Ax. The rotation center Ax can be also referred to as rotation axis or axial center. In the present embodiment, a front view is defined to be viewed from the right side of FIG. 2 and a rear view is defined to be viewed from the left side of FIG. 2 for the sake of convenience.

Figure 1:
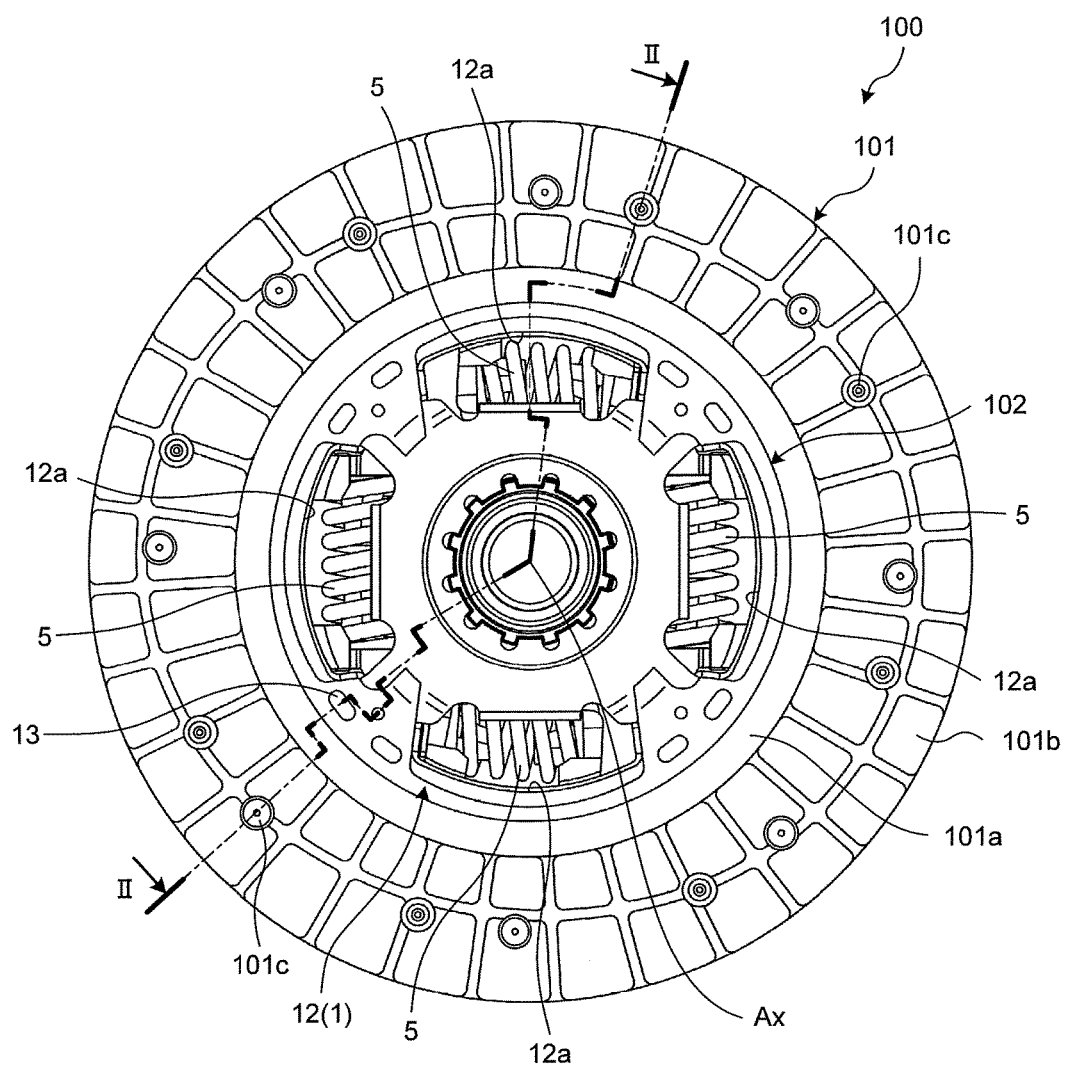
FIG. 1 is a front view of a damper device according to an embodiment as viewed in an axial direction.
Figure 2:
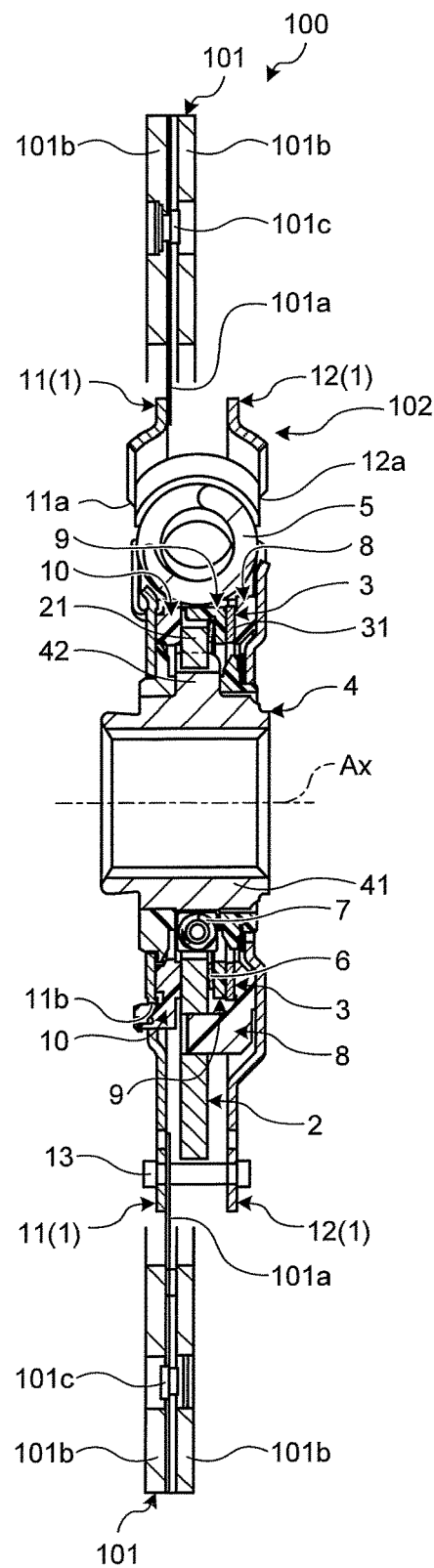
FIG. 2 is a cross-sectional view along line II-II of FIG. 1.

The damper device 100 rotates about the rotation center Ax to inhibit variation in driving force. The damper device 100 can be used in a vehicle, for example. As illustrated in FIGS. 1 and 2, the damper device 100 has a thin and flat disk shape in the axial direction of the rotation center Ax as a whole.

The damper device 100 has a disk 101 and a damper 102 in the disk 101. The disk 101 has a wall 101a extending in the radial direction, and covers 101b at the end of the radially extending wall 101a. The covers 101b can be also referred to as facings or pads. The wall 101a has an annular, plate-like shape. The covers 101b have an annular, plate-like shape and are provided on both sides of the wall 101a in the axial direction of the rotation center Ax. Each of the two covers 101b and 101b is located at a radially outside end of the wall 101a. The wall 101a and the two covers 101b and 101b are connected to each other with penetrating fasteners 101c, such as rivets.

Figure 3:
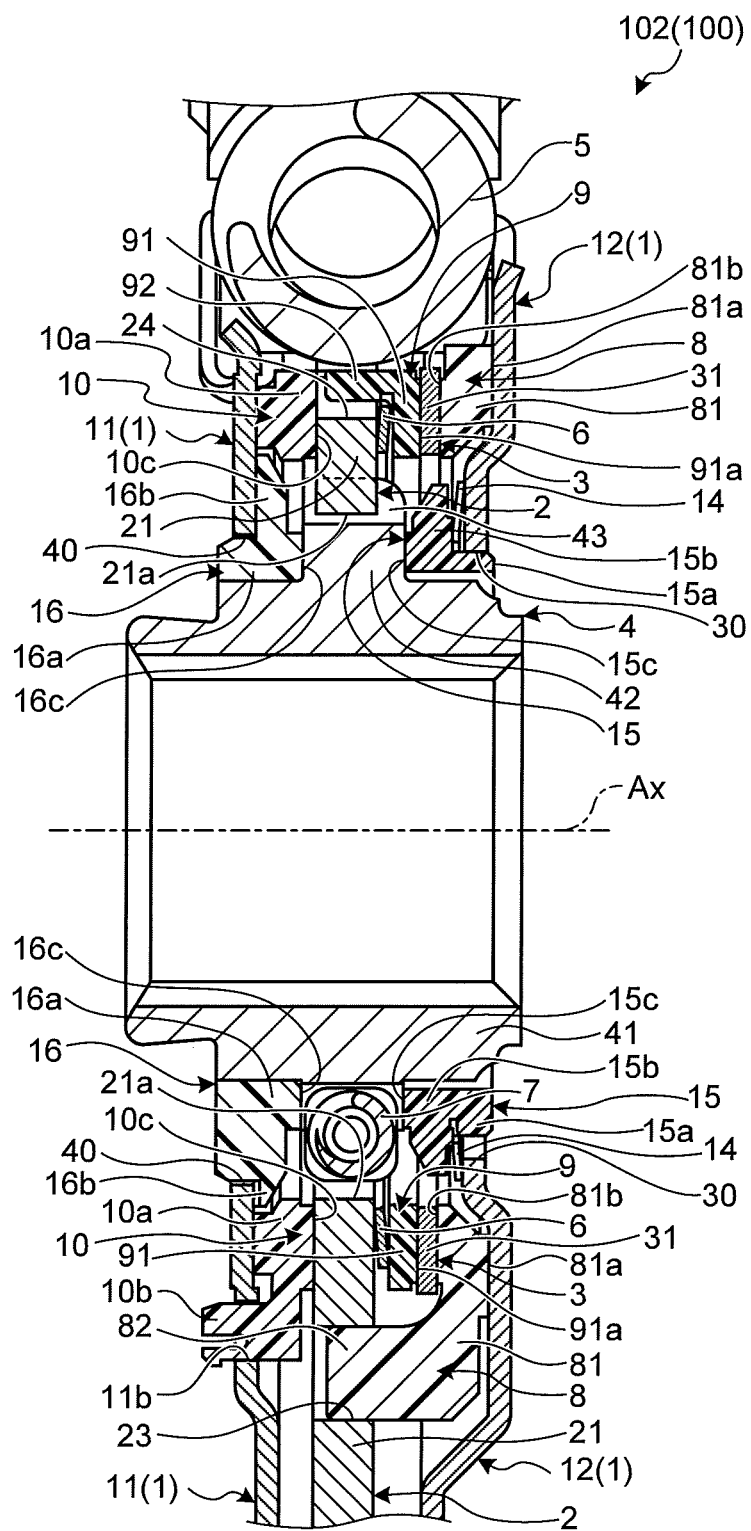
FIG. 3 is a partially enlarged cross-sectional view of an essential part of FIG. 2.

The damper 102 is disposed radially inside the disk 101, that is, closer to the rotation center Ax. As illustrated in FIG. 3, the damper 102 includes a first member 1, a second member 2, a third member 3, and a fourth member 4, a first resilient member 5, a second resilient member 6, a third resilient member 7, and a fourth resilient member 14, a first friction member 8, a second friction member 9, a third friction member 15, a fourth friction member 10, and a fifth friction member 16. The first member 1 and the second member 2 are configured to be rotatable about the rotation center Ax. In the present embodiment, for example, the first member 1 is connected to the engine on the input side, and the second member 2 is connected to the transmission on the output side. In the damper 102, the first resilient member 5 or the third resilient member 7 is resiliently expanded and contracted to reduce variation in torque.

As illustrated in FIGS. 2 and 3, the first member 1 has axially paired two walls 11 and 12. The first member 1 can be also referred to as outside member and the walls 11 and 12 can be also referred to as driving plates, outer plates, or side plates. The two walls 11 and 12 are axially separated from each other. In the present embodiment, for example, the wall 11 is located on one axial side of the wall 12, that is, on the left side in FIGS. 2 and 3, and the wall 12 is located on the other axial side of the wall 11, that is, on the right side in FIGS. 2 and 3. Each of the walls 11 and 12 has an annular, plate-like shape substantially orthogonal to the rotation center Ax. The walls 11 and 12 are provided with openings 11a, 11b, and 12a, respectively, at spacings in the circumferential direction of the rotation center Ax. The wall 11 and the wall 12 are connected to each other with fasteners 13 such as rivets illustrated on the lower side of FIG. 2 and integrally rotated about the rotation center Ax. Furthermore, the wall 11 and the wall 12 are connected to the wall 101a with the fasteners 13. That is, the first member 1 is rotated integrally with the disk 101 about the rotation center Ax. A radially outside area of the wall 11 and a radially outside area of the wall 12 are connected to each other, and at least a radially inside area of the wall 11 and at least a radially inside area of the wall 12 are separated in the axial direction. The first member 1 is made of for example a metal material.

Figure 4:
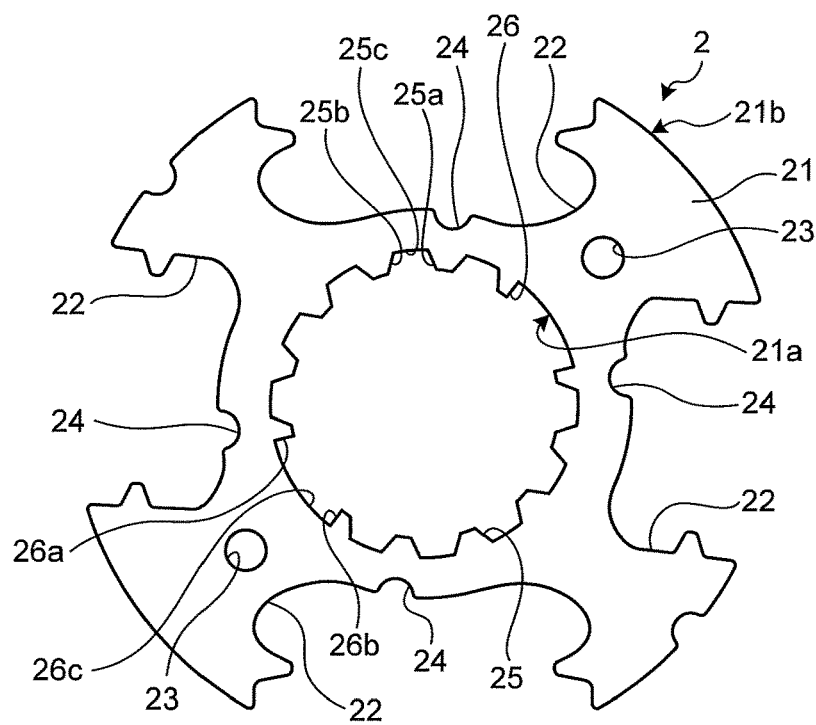
FIG. 4 is a front view of a second member illustrated in FIG. 1.

The second member 2 includes a wall 21 extending in the radial direction. The second member 2 can be also referred to as inside member and the wall 21 can be also referred to as driven plate, inner plate, or center plate. The wall 21 has an annular, plate-like shape substantially orthogonal to the rotation center Ax. The wall 21 is located between the wall 11 and the wall 12 with a spacing in the axial direction. Furthermore, as illustrated in FIG. 4, the wall 21 has an inner periphery 21a and an outer periphery 21b. The wall 21 and the inner periphery 21a are provided with openings 22, 23, 24, 25, and 26 at predetermined spacings in the circumferential direction of the rotation center Ax. The openings 22 and the openings 23 are formed for example as through-holes axially penetrating the wall 21. The openings 24 are formed as cutouts by for example cutting off the peripheral edges of the openings 22 in the wall 21. That is, the openings 24 communicate with the openings 22. Furthermore, the opening 25 and the opening 26 are formed for example as recesses which are opened radially inward. The openings 26 are located between two circumferentially adjacent openings 25 and 25 and have a circumferential width larger than the openings 25. The inner periphery 21a has faces 25a, 25b, and 25c and faces 26a, 26b, and 26c constituting the openings 25 and the openings 26, respectively. The faces 25a and 26a are on one circumferential side of the openings 25 and 26, respectively, that is, on the clockwise side in FIG. 4. The faces 25b and 26b are on the other circumferential side of the openings 25 and 26, respectively, that is, on the counterclockwise side in FIG. 4. The faces 25c and 26c extend over the faces 25a and 26a and the faces 25b and 26b, respectively. In the openings 26, the third resilient member 7 is supported by the faces 26a to 26c. The second member 2 is made of for example a metal material.

The first resilient member 5 is located between the first member 1 and the second member 2 and resiliently expanded and contracted with the relative rotation of the first member 1 and the second member 2 about the rotation center Ax to absorb and reduce the variation in torque. The first resilient member 5 is for example a coil spring made of a metal material and expands and contracts substantially in the circumferential direction. As illustrated in FIGS. 1 and 2, the first resilient member 5 is housed in the openings 11a, 12a, and 22 which are axially aligned with each other. In such a configuration, along with the relative rotation of the first member 1 and the second member 2 in such a direction that one circumferential edge of each of the openings 11a and 12a and the other circumferential edge of the opening 22 come closer to each other, the first resilient member 5 becomes resiliently contracted by the edges. In contrast, along with the relative rotation of the first member 1 and the second member 2 in such a direction that one circumferential edge of each of the openings 11a and 12a of the first member 1 and the other circumferential edge of the opening 22 of the second member 2 are moved away from each other, the first resilient member 5 becomes resiliently expanded from the resiliently contracted state in the openings 11a, 12a, and 22. The first resilient member 5 resiliently contracts to accumulate torque as a compression force and resiliently expands to release the compression force as torque. As described above, the damper 102 can reduce the variation in torque using the first resilient member 5.

Figure 5:
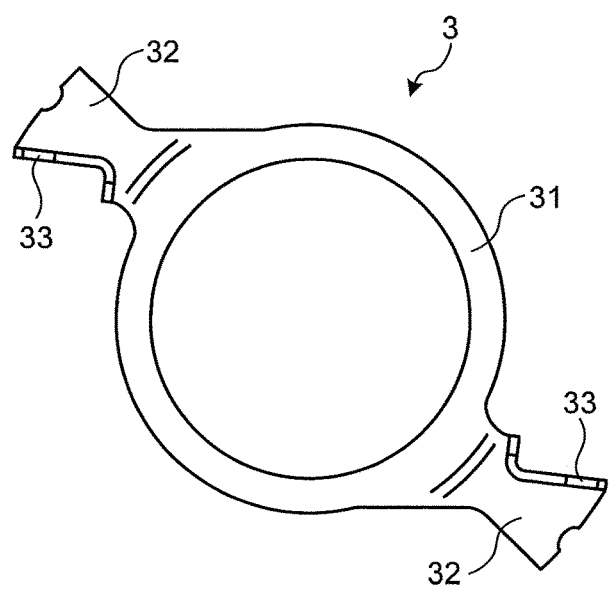
FIG. 5 is a front view of a third member illustrated in FIG. 1.
Figure 8:
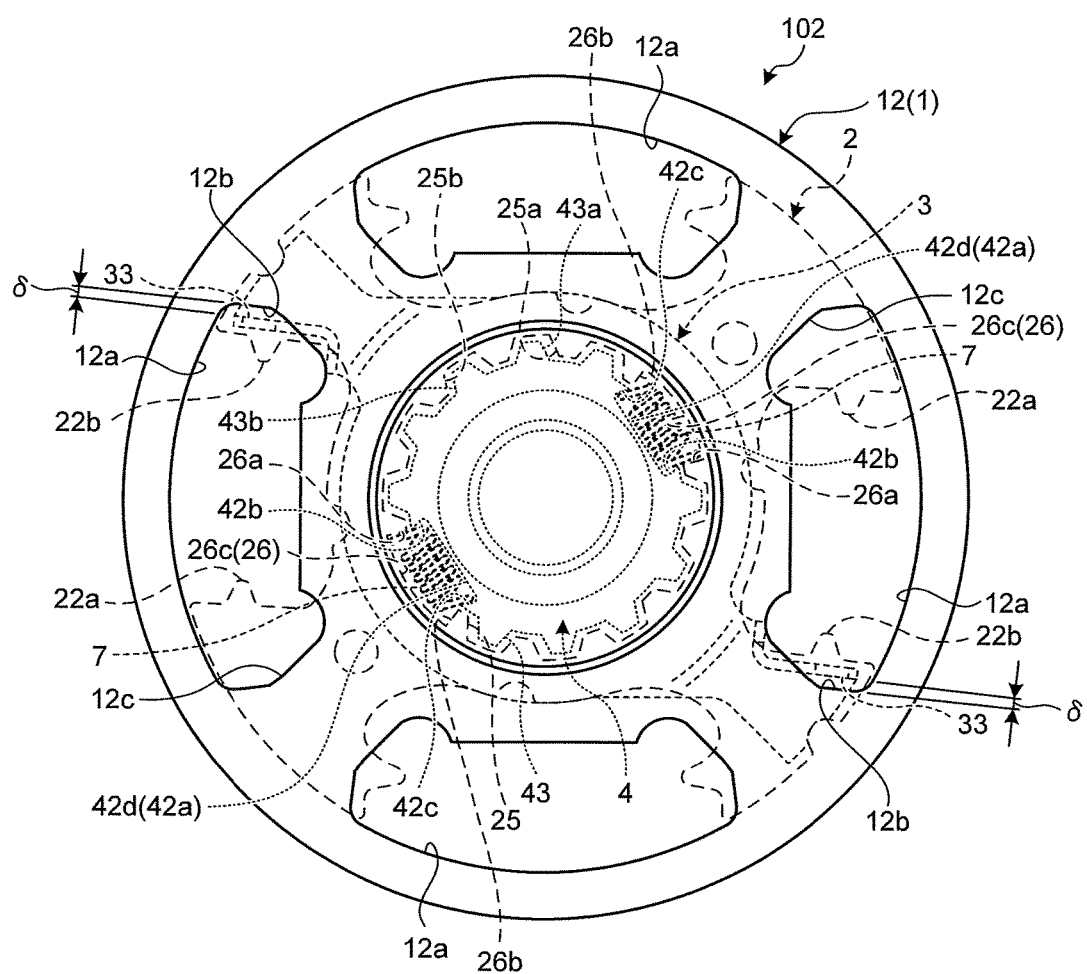
FIG. 8 is a front view of a damper in an O state illustrated in FIG. 7.

Next, the third member 3, the fourth member 4, the second resilient member 6, the third resilient member 7, the fourth resilient member 14, the first friction member 8, the second friction member 9, the third friction member 15, the fourth friction member 10, and the fifth friction member 16 will be described, with reference to FIGS. 2 to 6. As illustrated in FIG. 5, the third member 3 includes an annular wall 31, projections 32 extending radially outward from the wall 31, and hooks 33 provided on the circumferential side faces of the projections 32. The third member 3 can be also referred to as intermediate member. The wall 31 can be also referred to as middle plate or base, the projections 32 can be also referred to as arms, and the hooks 33 can be also referred to as claws or latches. The wall 31 has a ring shape about the rotation center Ax. As illustrated in FIG. 3, the wall 31 is located between the wall 12 of the first member 1 and the wall 21 of the second member 2 with a spacing in the axial direction. As illustrated in FIG. 5, each of the projections 32 projects radially outward from the wall 31. In the present embodiment, the projections 32 are provided with a spacing in the circumferential direction of the rotation center Ax. Specifically, the two projections 32 and 32 are circumferentially provided at a constant spacing, for example, at a 180° spacing, on radially opposite sides. The hooks 33 are, for example, portions projecting axially to the other side from the projections 32, that is, rightward in FIG. 3. The hooks 33 are provided on the respective projections 32. As illustrated in FIG. 8, the hooks 33 project from the projections 32 into the opening 12a of the wall 12. That is, the hooks 33 partially, axially overlap a peripheral edge of the opening 12a of the wall 12. The third member 3 is made of for example a metal material.

Figure 6:
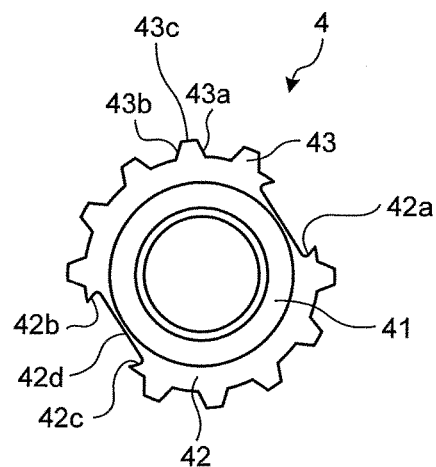
FIG. 6 is a front view of a fourth member illustrated in FIG. 1.

As illustrated in FIGS. 3 and 6, the fourth member 4 includes a cylindrical part 41, a wall 42 radially extending from the cylindrical part 41, and projections 43 at the tip of the wall 42. The fourth member 4 can be also referred to as central member. Furthermore, the cylindrical part 41 can be also referred to as base or hub, and the wall 42 can be also referred to as overhang. The cylindrical part 41 has a tubular shape about the rotation center Ax. The wall 42 projects radially outward from the cylindrical part 41 and has a substantially annular, plate-like shape substantially orthogonal to the rotation center Ax. As illustrated in FIG. 6, the wall 42 is provided with openings 42a with a spacing in the circumferential direction of the rotation center Ax. Specifically, in the present embodiment, two openings 42a and 42a are provided as recesses which are opened radially outward. The wall 42 has faces 42b, 42c, and 42d constituting each opening 42a. The face 42b is located on one circumferential side of the opening 42a, that is, on the clockwise side in FIG. 6, the face 42c is located on the other circumferential side of the opening 42a, that is, on the counterclockwise side in FIG. 6, and the face 42d extends over the face 42b and the face 42c. The face 42c is located in the vicinity of a face 26b of the second member 2 as illustrated in FIGS. 4 and 8, opposing an end of the third resilient member 7 which projects radially inward from the opening 26. The projections 43 project radially outward from the wall 42. In the present embodiment, the projections 43 are provided with a spacing in the circumferential direction of the rotation center Ax. The projections 43 each have faces 43a, 43b, and 43c. The face 43a is on one circumferential side, that is, on the clockwise side in FIG. 6, the face 43b is on the other circumferential side, that is, on the counterclockwise side in FIG. 6, and the face 43c extends over the face 43a and the face 43b. The projections 43 are disposed in the opening 25 of the second member 2 illustrated in FIGS. 4 and 8, the face 43a and the face 25a oppose each other, the face 43b and the face 25b oppose each other, and the face 43c and the face 25c oppose each other. The fourth member 4 is made of for example a metal material.

As illustrated in FIGS. 2 and 3, the third resilient member 7 is located between the second member 2 and the fourth member 4 to resiliently expand and contract along with the relative rotation of the second member 2 and the fourth member 4 about the rotation center Ax. The third resilient member 7 is a coil spring made of for example a metal material to expand and contract substantially in the circumferential direction. As illustrated in FIGS. 4, 6, and 8, the third resilient member 7 is housed in the openings 26 and 42a which radially oppose each other. In such a configuration, for example, along with the relative rotation of the opening 26 and the opening 42a such that the face 26a on one circumferential side and the face 42c on the other circumferential side approach each other, the third resilient member 7 becomes resiliently contracted by the faces 26a and 42c. In contrast, along with the relative rotation of the opening 26 and the opening 42a such that the face 26a on one circumferential side and the face 42c on the other circumferential side are moved away from each other, the third resilient member 7 becomes resiliently expanded from the resiliently contracted state in the openings 26 and 42a. The third resilient member 7 resiliently contracts to accumulate torque as a compression force, and resiliently expands to release the compression force as torque. As described above, the damper 102 can also reduce the variation in torque using the third resilient member 7.

As illustrated in FIG. 3, the first friction member 8 has a first part 81 and second parts 82. The first part 81 can be also referred to as base, and the second parts 82 can be also referred to as projections. The first part 81 has an annular, plate-like shape substantially orthogonal to the rotation center Ax. The first part 81 is placed between the wall 12 of the first member 1 and the wall 31 of the third member 3. Furthermore, the first part 81 has a first friction face 81a as a friction face and a third friction face 81b as a friction face. The first friction face 81a opposes the wall 12, contacts with the wall 12, and rubs against the wall 12. The third friction face 81b opposes the wall 31, contacts with the wall 31, and rubs against the wall 31. The second parts 82 are located at a radially outside end of the first part 81 and projects axially to one side from the end, that is, leftward in FIG. 3. In the present embodiment, the second parts 82 can be provided at a spacing in the circumferential direction of the rotation center Ax, corresponding to the openings 23 of the second member 2 illustrated in FIG. 4. Each of the second parts 82 is inserted into the opening 23 with a slight gap in the radial direction and axially movable by the second resilient member 6 illustrated in FIG. 3, and urged toward the wall 12. Thus, the first friction member 8 is at least circumferentially integrated with the second member 2. That is, the first friction member 8 is rotated integrally with the second member 2 about the rotation center Ax. The first friction member 8 is made of for example a synthetic resin material.

The second friction member 9 includes a first part 91 and second parts 92. The first part 91 can be also referred to as base and the second parts 92 can be also referred to as projections. The first part 91 has an annular, plate-like shape substantially orthogonal to the rotation center Ax. The first part 91 is placed between the wall 21 of the second member 2 and the wall 31 of the third member 3 through the second resilient member 6. Furthermore, the first part 91 has a second friction face 91a as a friction face. The second friction face 91a opposes the wall 31, contacts with the wall 31, and rubs against the wall 31. The second parts 92 are located at a radially outside end of the first part 91 and projects axially to one side from the end, that is, leftward in FIG. 3. In the present embodiment, the second parts 92 can be provided at a spacing in the circumferential direction of the rotation center Ax, corresponding to the openings 24 of the second member 2 illustrated in FIG. 4. The second parts 92 are inserted into the openings 24 and axially moveable by an urging force of the second resilient member 6 in FIG. 3 toward the wall 12. Thus, the second friction member 9 is at least circumferentially integrated with the second member 2. That is, the second friction member 9 is rotated integrally with the second member 2 about the rotation center Ax. Note that, the second parts 92 of the second friction member 9 can be inhibited from radially moving outward by the first resilient member 5 disposed in the opening 22 of the second member 2. The second friction member 9 is made of for example a synthetic resin material.

The fourth friction member 10 has a first part 10a and second parts 10b. The first part 10a can be also referred to as base and the second parts 10b can be also referred to as projections. The first part 10a has an annular, plate-like shape substantially orthogonal to the rotation center Ax. The first part 10a is placed between the wall 11 of the first member 1 and the wall 21 of the second member 2. Furthermore, the first part 10a has a fifth friction face 10c as a friction face. The fifth friction face 10c opposes the wall 21, contacts with the wall 21, and rubs against the wall 21. The second parts 10b are located at a radially outside end of the first part 10a and projects axially to one side from the end, that is, leftward in FIG. 3. In the present embodiment, the second parts 10b can be provided at a spacing in the circumferential direction of the rotation center Ax, corresponding to the openings 11b of the wall 11. The second parts 10b are inserted into the openings 11b to be axially movable along with abrasion of the fifth friction face 10c. Thus, the fourth friction member 10 is at least circumferentially integrated with the wall 11. That is, the fourth friction member 10 is rotated integrally with the first member 1 about the rotation center Ax. The fourth friction member 10 is made of for example a synthetic resin material.

The second resilient member 6 is located between the wall 21 of the second member 2 and the first part 91 of the second friction member 9 to apply a resilient force to move the wall 21 and the first part 91 away from each other. Furthermore, the second resilient member 6 is axially aligned with the first friction face 81a, the third friction face 81b, the second friction face 91a, and the fifth friction face 10c. That is, the second resilient member 6 presses the second friction member 9 onto the wall 12 of the first member 1, holding the third member 3 and the first friction member 8 therebetween, and presses the second member 2 onto the wall 11 of the first member 1, holding the fourth friction member 10 therebetween. As described above, the second resilient member 6 can apply a sliding resistance to the first friction face 81a, the third friction face 81b, the second friction face 91a, and the fifth friction face 10c. The second resilient member 6 is for example an annular cone spring made of a metal material.

The third friction member 15 has a cylindrical part 15a, a projection 15b, and a fourth friction face 15c as a friction face. The cylindrical part 15a has a tubular shape about the rotation center Ax. The projection 15b projects radially outward from the cylindrical part 15a and has an annular, plate-like shape substantially orthogonal to the rotation center Ax. The fourth friction face 15c opposes the wall 42 of the fourth member 4. While the fourth friction face 15c is in contact with the wall 42, the projection 15b is placed between the wall 12 and the wall 42 through the fourth resilient member 14. The cylindrical part 15a is exposed from an opening 30 between the wall 12 and the cylindrical part 41. The third friction member 15 is made of for example a synthetic resin material.

The fifth friction member 16 has a cylindrical part 16a, a projection 16b, and a sixth friction face 16c as a friction face. The cylindrical part 16a has a cylindrical shape about the rotation center Ax. The projection 16b projects radially outward from the cylindrical part 16a and has an annular, plate-like shape substantially orthogonal to the rotation center Ax. The sixth friction face 16c opposes the wall 42 of the fourth member 4. While the sixth friction face 16c is in contact with the wall 42, the projection 16b is placed between the wall 11 and the wall 42. The cylindrical part 16a is exposed from an opening 40 between the wall 11 and the cylindrical part 41. The fifth friction member 16 is made of for example a synthetic resin material.

The fourth resilient member 14 is located between the wall 12 and the third friction member 15, and applies a resilient force to the wall 12 and the third friction member 15 so as to move them away from each other. Furthermore, the fourth resilient member 14 is axially aligned with the fourth friction face 15c and the sixth friction face 16c. That is, the fourth resilient member 14 presses the third friction member 15 onto the wall 11, holding the wall 42 and the fifth friction member 16 therebetween. As described above, the fourth resilient member 14 can apply a sliding resistance to the fourth friction face 15c and the sixth friction face 16c. The fourth resilient member 14 is for example an annular cone spring made of a metal material.

Figure 7:
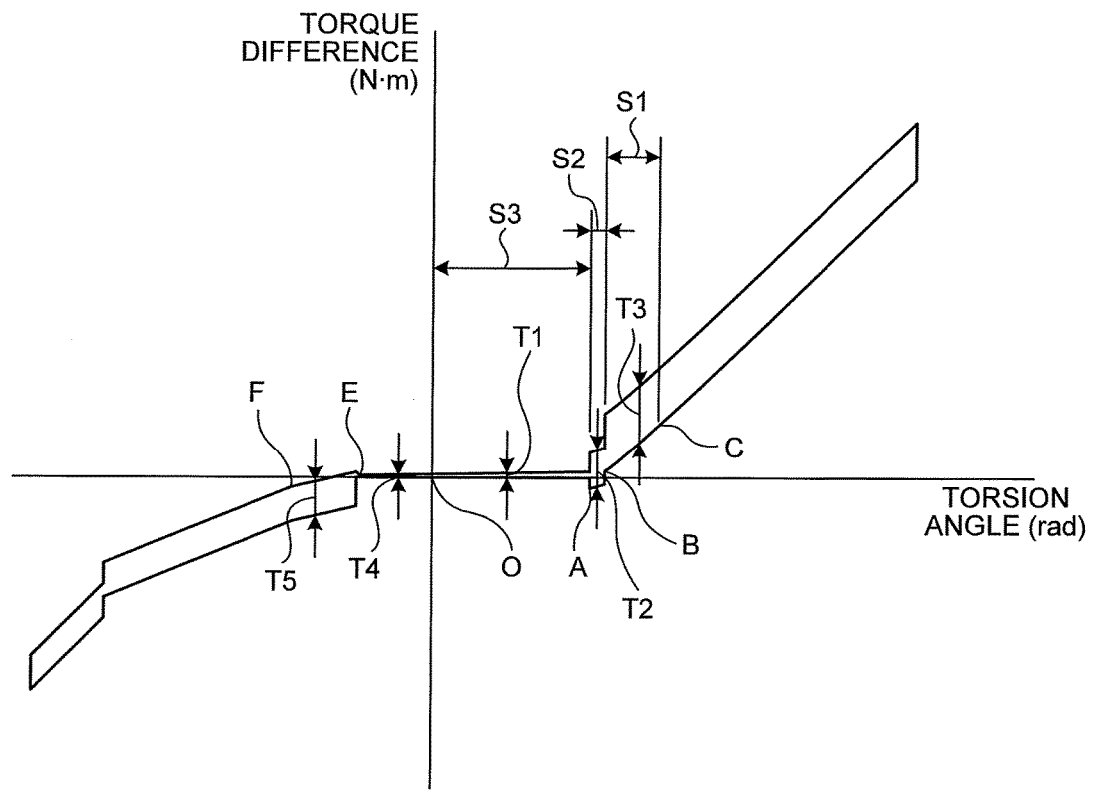
FIG. 7 is a characteristic diagram illustrating a relationship between a torsion angle (difference in angle) and a torque difference, between an input side and an output side of the damper device.

Next, the relative rotation of the first member 1, the second member 2, the third member 3, and the fourth member 4, and the variation in friction torque along with the relative rotation will be described, with reference to FIGS. 7 to 13. The friction torque may be also referred to as sliding torque or resistance torque. FIG. 7 illustrates an example of a relationship between torsion angle and a torque difference between the input side and the output side. In the characteristic diagram of FIG. 7, the horizontal axis represents the torsion angle, and the vertical axis represents the torque difference. The horizontal axis of FIG. 7 represents the rotational angle of the fourth member 4 relative to the first member 1, that is, the torsion angle. In FIG. 7, the fourth member 4 has a larger clockwise rotational angle relative to that of the first member 1, toward the right side of the horizontal axis. The vertical axis of FIG. 7 represents a torque difference between the first member 1 and the fourth member 4. In FIG. 7, the more upward position along the vertical axis indicates a larger clockwise torque difference.

FIG. 8 illustrates the first member 1 and the fourth member 4 in a state with no torque difference. Note that, the state in FIG. 8 corresponds to the O state in FIG. 7. The O state can be also referred to as initial state or free state. In this O state, the opening 25 of the second member 2 and the projection 43 of the fourth member 4 are not in contact with each other, as illustrated in FIG. 8. Specifically, gaps occur between the face 25a of the opening 25 and the face 43a of the projection 43 and between the face 25b of the opening 25 and the face 43b of the projection 43. Furthermore, the faces 42b and 42c of the opening 42a of the fourth member 4 make contact with the third resilient member 7 having a free length in the initial state.

Figure 9:
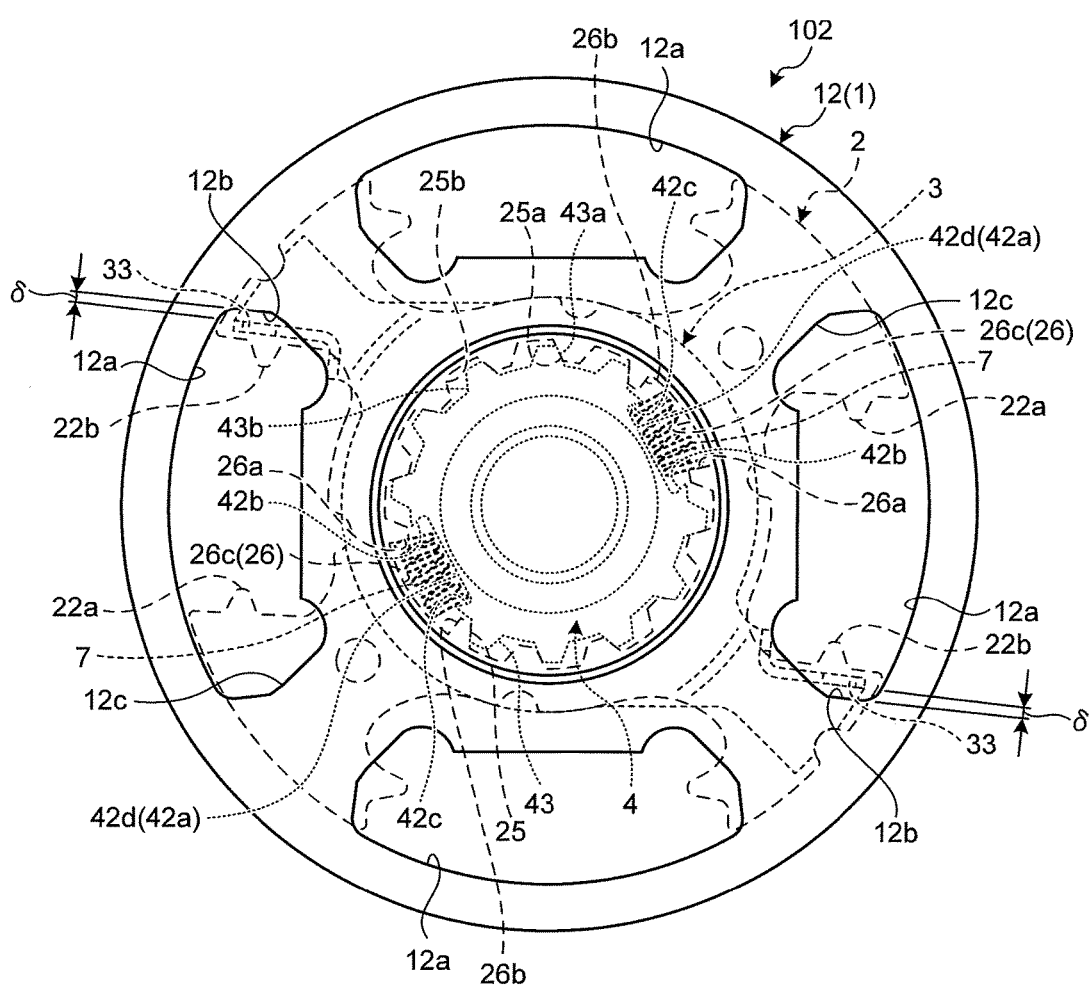
FIG. 9 is a front view of a damper in an A state illustrated in FIG. 7.

FIG. 9 illustrates a state of the fourth member 4 when rotated clockwise by a predetermined angle relative to the first member 1 from the state in FIG. 8. The state in FIG. 9 corresponds to the A state in FIG. 7. Between the O state and the A state, that is, in a third section S3 of FIG. 7, the third resilient member 7 is resiliently contracted between the face 42c of the opening 42a and the face 26a of the opening 26. Herein, the inclination of the graph in FIG. 7 corresponds to a spring constant of the resilient member. The third resilient member 7 has a spring constant which is smaller than the spring constant of another resilient member such as the first resilient member 5, for example. In the third section S3, the first member 1 and the fourth member 4 are thus twisted relatively largely in accordance with a relatively small variation in torque difference. Furthermore, in the third section S3, by a frictional force generated by a pressing force of the fourth resilient member 14 or the second resilient member 6 illustrated in FIG. 3, the first member 1, the second member 2, and the third member 3 are integrally rotated. Thus, in the third section S3, the rotation of the fourth member 4 relative to the first member 1, the second member 2, the third member 3, the first friction member 8, the second friction member 9, the third friction member 15, the fourth friction member 10, and the fifth friction member 16 causes the wall 42 and the fourth friction face 15c to slide and the wall 42 and the sixth friction face 16c to slide, as illustrated in FIG. 3. As described above, the sliding of two friction faces, the fourth friction face 15c and the sixth friction face 16c, generates a relatively low first friction torque T1 illustrated in FIG. 7. As illustrated in FIGS. 8 and 9, in the third section S3 a gap δ (δ>0) is provided between the hooks 33 of the third member 3 and an edge 12b of the opening 12a of the wall 12.

Figure 10:
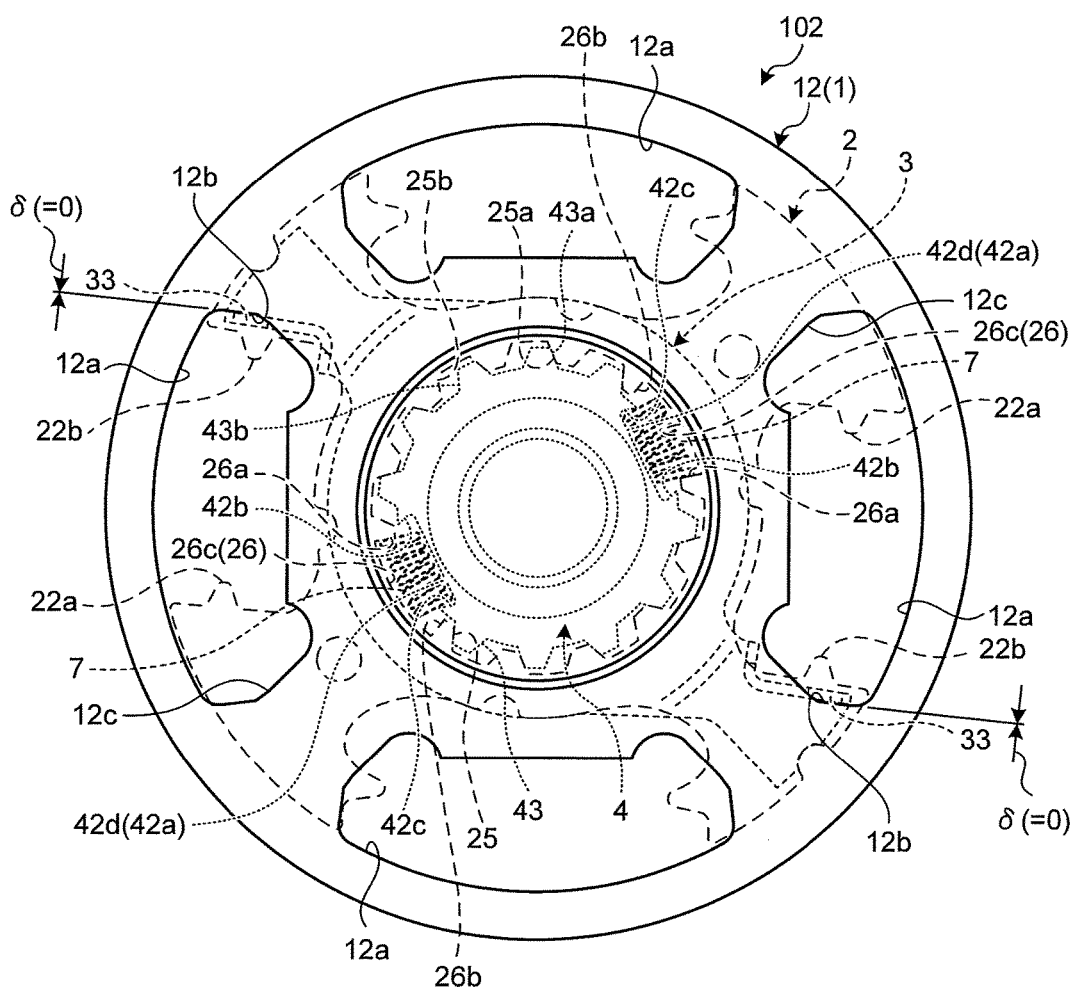
FIG. 10 is a front view of a damper in a B state illustrated in FIG. 7.

FIG. 10 illustrates the state of the fourth member 4 when rotated clockwise by a predetermined angle relative to the first member 1 from the state in FIG. 9. The state in FIG. 10 corresponds to the B state in FIG. 7. In the A state, the face 25a of the opening 25 and the face 43a of the projection 43 are in contact with each other, as illustrated in FIG. 9. By the contacting face 25a and face 43a, the clockwise movement of the fourth member 4 relative to the second member 2 is restricted. That is, while the fourth member 4 further rotates clockwise from the A state, the second member 2 and the fourth member 4 are integrally rotated. Furthermore, between the A state and the B state, that is, in a second section S2 of FIG. 7, the pressing force of the second resilient member 6 illustrated in FIG. 3 generates a frictional force between the second friction member 9 and the wall 12 and a frictional force between the second member 2 and the wall 11 to integrally rotate the second member 2 and the third member 3. Thus, in the second section S2, the integral rotation of the fourth member 4, the second member 2, the third member 3, the first friction member 8, and the second friction member 9 with the first member 1, the third friction member 15, the fourth friction member 10, and the fifth friction member 16 causes the first friction face 81a and the wall 12 to slide, the fifth friction face 10c and the wall 21 to slide, the wall 42 and the fourth friction face 15c to slide, and the wall 42 and the sixth friction face 16c to slide. As described above, the sliding of four friction faces, the first friction face 81a, the fifth friction face 10c, the fourth friction face 15c, and the sixth friction face 16c, generates a second friction torque T2 larger than the first friction torque T1 illustrated in FIG. 7. Note that, in the second section S2, by the integral rotation of the second member 2 and the fourth member 4, the third resilient member 7 remains in the contracted state as illustrated in FIG. 9 and inhibited from further contraction. Furthermore, as illustrated in FIGS. 9 and 10, as the fourth member rotates further to be placed in the B state, the gap δ approaches 0.

Figure 11:
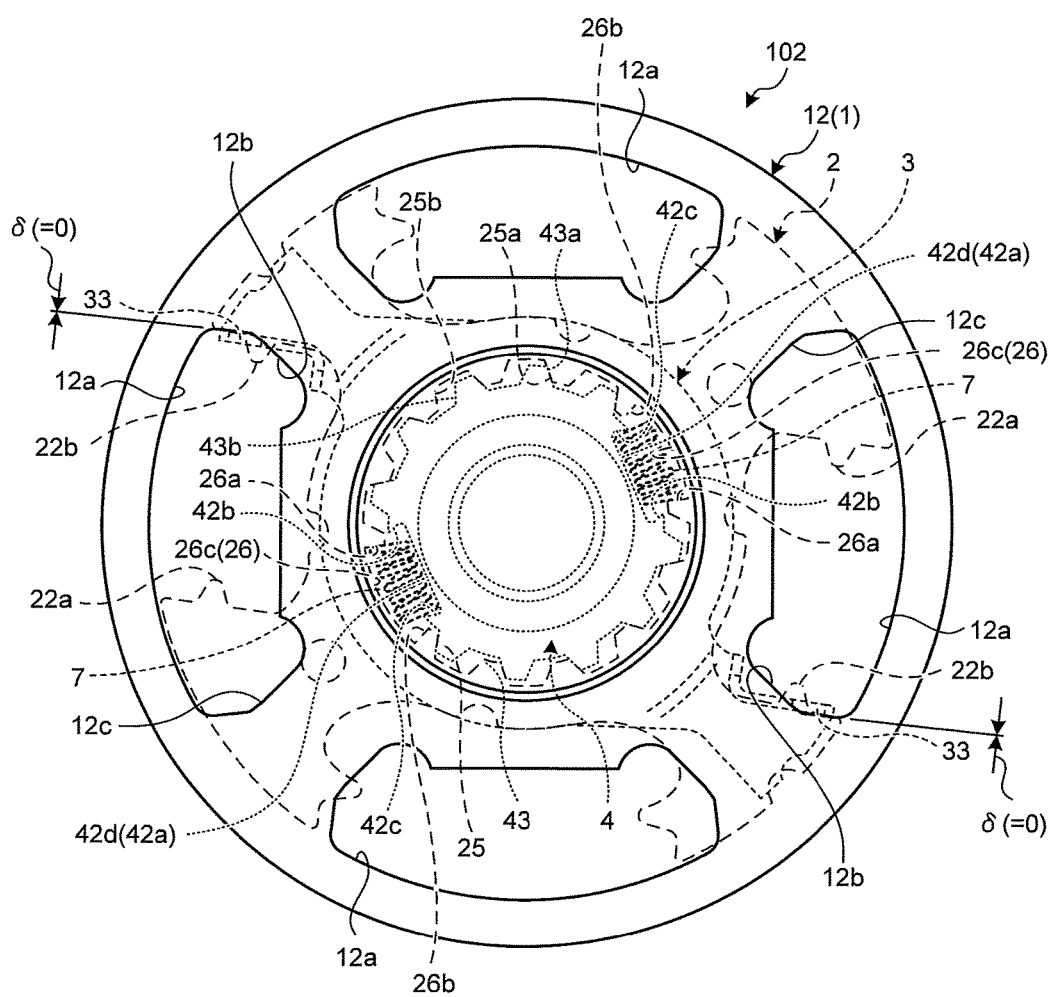
FIG. 11 is a front view of a damper in a C state illustrated in FIG. 7.

FIG. 11 illustrates the state of the fourth member 4 when rotated clockwise by a predetermined angle relative to the first member 1 in the state in FIG. 10. The state in FIG. 11 corresponds to a C state in FIG. 7. In the B state, the hooks 33 of the third member 3 catch the edge 12b of the opening 12a of the wall 12 (gap δ=0), as illustrated in FIG. 10. By the contacting hooks 33 and edge 12b, the clockwise movement of the third member 3 relative to the first member 1 is restricted. That is, while the fourth member 4 further rotates clockwise from the B state, the third member 3 does not follow the fourth member 4 but rotates integrally with the first member 1. Furthermore, between the B state and the C state, that is, in a first section S1 of FIG. 7, the first resilient member 5 is resiliently contracted between the edge 12b of the opening 12a and 11a of the first member 1 and an edge 22a of the opening 22 of the second member 2 illustrated in FIG. 11. That is, in the first section S1, the integral rotation of the fourth member 4, the second member 2, the first friction member 8, and the second friction member 9 with the first member 1, the third member 3, the third friction member 15, the fourth friction member 10, and the fifth friction member 16 causes the first friction face 81a and the wall 12 to slide, the fifth friction face 10c and the wall 21 to slide, the third friction face 81b and the wall 31 to slide, the second friction face 91a and the wall 31 to slide, the wall 42 and the fourth friction face 15c to slide, and the wall 42 and the sixth friction face 16c to slide, as illustrated in FIG. 3. As described above, the sliding of six friction faces, the first friction face 81a, the third friction face 81b, the second friction face 91a, the fifth friction face 10c, the fourth friction face 15c, and the sixth friction face 16c, generates a third friction torque T3 larger than the first friction torque T1 and the second friction torque T2 illustrated in FIG. 7. Note that, in the first section S1, the third resilient member 7 also remains in the contracted state in FIG. 9.

Figure 12:
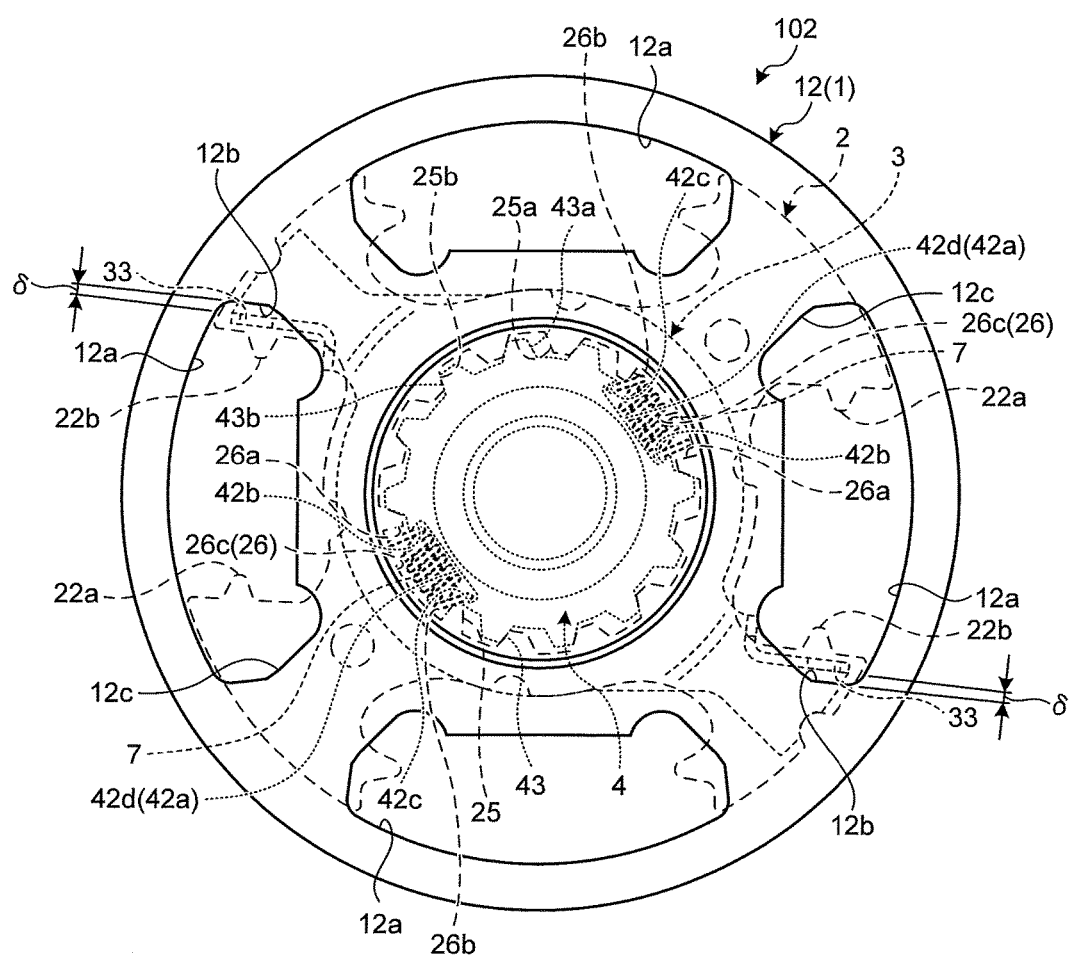
FIG. 12 is a front view of a damper in an E state illustrated in FIG. 7.

FIG. 12 illustrates the state of the fourth member 4 when rotated counterclockwise by a predetermined angle relative to the first member 1 and the second member 2 from the state in FIG. 8. The state in FIG. 12 corresponds to an E state in FIG. 7. Between the O state and the E state, the third resilient member 7 is resiliently contracted between the face 42b of the opening 42a and the face 26b of the opening 26 illustrated in FIG. 12. Furthermore, between the O state and the E state, the rotation of the fourth member 4 relative to the first member 1, the second member 2, the third member 3, the first friction member 8, the second friction member 9, the third friction member 15, the fourth friction member 10, and the fifth friction member 16 causes the wall 42 and the fourth friction face 15c to slide, and the wall 42 and the sixth friction face 16c to slide, as illustrated in FIG. 3. As described above, the sliding of two friction faces, the fourth friction face 15c and the sixth friction face 16c, generates a relatively low fourth friction torque T4 illustrated in FIG. 7.

Figure 13:
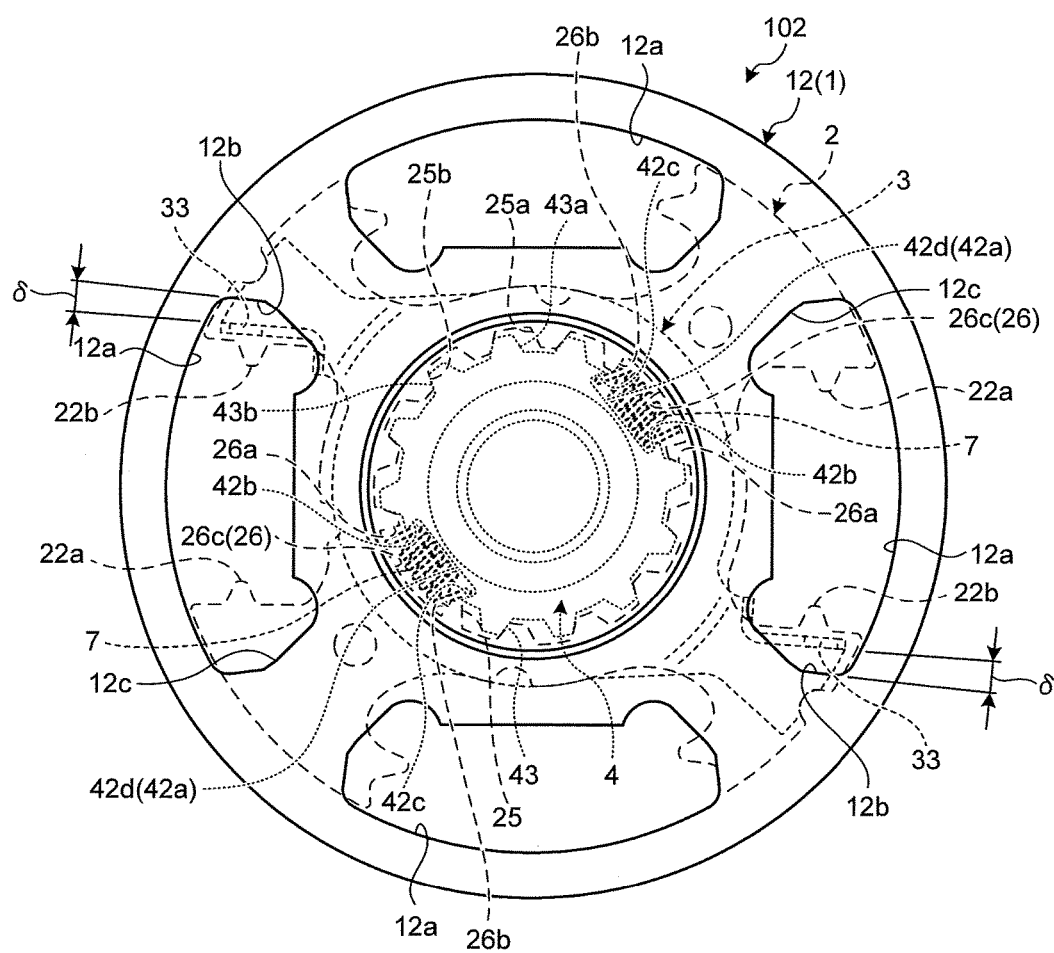
FIG. 13 is a front view of a damper in an F state illustrated in FIG. 7.

FIG. 13 illustrates the state of the fourth member 4 when rotated counterclockwise by a predetermined angle relative to the first member 1 from the state in FIG. 12. The state in FIG. 13 corresponds to an F state in FIG. 7. In the E state, the face 25b of the opening 25 and the face 43b of the projection 43 are in contact with each other, as illustrated in FIG. 12. By the contacting face 25b and face 43b, the clockwise movement of the fourth member 4 relative to the second member 2 is restricted. That is, while the fourth member 4 further rotates counterclockwise from the E state, the second member 2 and the fourth member 4 are integrally rotated. Between the E state and the F state, the first resilient member 5 is resiliently contracted between an edge 12c of the opening 12a and 11a of the first member 1 and an edge 22b of the opening 22 of the second member 2, as illustrated in FIG. 13. The edge 12c is circumferentially opposite to the edge 12b of the opening 12a, and the edge 22b is circumferentially opposite to the edge 22a of the opening 22. Furthermore, between the E state and the F state, the pressing force of the second resilient member 6 illustrated in FIG. 3 generates the frictional force between the second friction member 9 and the wall 12 and the frictional force between the second member 2 and the wall 11 to integrally rotate the second member 2 and the third member 3. Thus, between the E state and the F state, the integral rotation of the fourth member 4, the second member 2, the third member 3, the first friction member 8, and the second friction member 9 with the first member 1, the third friction member 15, the fourth friction member 10, and the fifth friction member 16 causes the first friction face 81a and the wall 12 to slide, the fifth friction face 10c and the wall 21 to slide, the wall 42 and the fourth friction face 15c to slide, and the wall 42 and the sixth friction face 16c to slide. As described above, the sliding of the four friction faces, the first friction face 81a, the fifth friction face 10c, the fourth friction face 15c, and the sixth friction face 16c generates a fifth friction torque T5 larger than the fourth friction torque T4 illustrated in FIG. 7. Between the E state and the F state, by the integral rotation of the second member 2 and the fourth member 4, the third resilient member 7 remains contracted as illustrated in FIG. 12 and inhibited from further contraction.

As described above, in the present embodiment, between the third section S3 in which a lower friction torque, the first friction torque T1, is generated and the first section S1 in which a higher friction torque, the third friction torque T3, is generated, for example, the second section S2 in which the second friction torque T2 of a value between the two friction torques is generated is provided. According to the present embodiment, for example, a level difference in the friction torque from the third section S3 to the first section S1 can be thus reduced. This can accordingly suppress sudden change in the friction torque and inhibit vibration or noise in the state transition between the first section S1 and the third section S3, for example. The present embodiment illustrates the third section S3 in which the lower friction torque is generated, for example, however, it should not be limited such an example. The third section S3 can be omitted or the third section S3 may have a friction torque of 0. Furthermore, in the present embodiment, the magnitudes of the first friction torque T1, the second friction torque T2, and the third friction torque T3 are set by setting the number of the friction faces to slide among the first friction face 81a, the second friction face 91a, the third friction face 81b, the fourth friction face 15c, the fifth friction face 10c, and the sixth friction face 16c, but the present embodiment should not be limited thereto. The magnitudes of the first friction torque T1, the second friction torque T2, and the third friction torque T3 may be set for example by setting the materials, face roughness or contact area of the first friction member 8, second friction member 9, the third friction member 15, the fourth friction member 10, and the fifth friction member 16. In the present embodiment, the fourth friction face 15c and the sixth friction face 16c which generate the first friction torque T1 are provided on the third friction member 15 and the fifth friction member 16 located near the rotation center Ax, respectively, which can advantageously shorten the moment arms of the fourth friction face 15c and the sixth friction face 16c and readily attain a lower friction torque.

Further, in the present embodiment, for example, by the circumferential connection between the hooks 33 and the first member 1, the first member 1 and the third member 3 are integrally rotated, and when the hooks 33 do not circumferentially catch the first member 1, the second member 2 and the third member 3 are integrally rotated by a frictional force between the second member 2 and the third member 3. Thus, according to the present embodiment, for example, the first section S1 and the second section S2 is attainable with a simpler configuration by use of the connection or non-connection between the hooks 33 and the first member 1.

Furthermore, in the present embodiment, for example, the first friction member 8 has the third friction face 81b to slide along with the relative rotation of the second member 2 and the third member 3, in addition to the first friction face 81a. Thus, according to the present embodiment, for example, the third friction face 81b of the first friction member 8 can provide sliding resistance, resulting in further inhibiting vibration or noise.

In the present embodiment, for example, the second resilient member 6 is provided for pressing the first friction face 81a, the second friction face 91a, and the third friction face 81b. Thus, according to the present embodiment, the second resilient member 6 can effectively provide sliding resistance on the first friction face 81a, the second friction face 91a, and the third friction face 81b.

In the present embodiment, for example, the second resilient member 6, and the first friction face 81a, the second friction face 91a, and the third friction face 81b at least partially overlap one another in the axial direction. Thus, the second resilient member 6 can further increase the pressing force and sliding resistance on the first friction face 81a, the second friction face 91a, and the third friction face 81b.

The additional configurations to the above-mentioned configuration will be described below.

A damper device includes a pair of outside members that rotates about the rotation center, an inside member provided inside the outside member, that rotates relative to the outside member, an intermediate member that rotates integrally with the outside member in a first section and rotates integrally with the inside member in a second section, a first resilient member provided between the outside member and the inside member, that contracts along with the relative rotation of the outside member and the inside member and inhibits variation in torque between the outside member and the inside member, a first friction member provided between the outside member and the intermediate member and having a first friction face that generates a friction torque with the outside member along with the relative rotation of the outside member and the inside member, and a second friction member provided between the inside member and the intermediate member and having a second friction face that generates a friction torque with the intermediate member along with the relative rotation of the outside member and the inside member.

The damper device further includes a central member provided in the inside member, that rotates by the rotation of the inside member, and a fourth friction member provided between the outside member and the inside member.

The damper device further includes a third friction member provided between the outside member and the central member, and a fourth resilient member provided between the third friction member and the outside member for urging the third friction member to the central member.

In the damper device, when the outside member and the central member are twisted on the rotation center, a friction torque is generated on a fourth friction face between the central member and the third friction member for sliding (O-A area in FIG. 7).

In the damper device, when the outside member and the central member are twisted on the rotation center at or over a torsion angle that causes the central member and the third friction member to slide, the inside member and the fourth friction member slide (A-B area).

In the damper device, when the outside member and the first friction member have a torsion angle larger than sliding between them, the intermediate member and the first friction member slide (B-C area).

In the damper device, when the outside member and the first friction member have a torsion angle larger than sliding between them, the intermediate member and the second friction member slide (B-C area).

According to the above configuration, the first to fourth friction members are provided on the outside member, the inside member, the intermediate member, and the central member, as illustrated in the configuration of FIG. 3, to be able to attain sliding resistance and inhibit vibration or noise.

The embodiment of the present invention has been exemplified above for the purpose of merely presenting an example and is not intended to limit the scope of the invention. The embodiment described above may be implemented in various forms, and various omissions, substitutions, combinations, and modifications may be made without departing from the spirit of the invention. Specifications (structure, type, direction, shape, size, length, width, thickness, height, quantity, arrangement, position, material, and the like) of each configuration, shape, or the like may be appropriately modified for implementation.

EXPLANATIONS OF LETTERS OR NUMERALS

1 FIRST MEMBER
2 SECOND MEMBER
3 THIRD MEMBER
4 FOURTH MEMBER
5 FIRST RESILIENT MEMBER
6 SECOND RESILIENT MEMBER
7 THIRD RESILIENT MEMBER
8 FIRST FRICTION MEMBER
9 SECOND FRICTION MEMBER
15 THIRD FRICTION MEMBER
15c FOURTH FRICTION FACE
33 HOOK
81a FIRST FRICTION FACE
81b THIRD FRICTION FACE
91a SECOND FRICTION FACE
S1 FIRST SECTION
S2 SECOND SECTION
S3 THIRD SECTION
T1 FRICTION TORQUE (FIRST FRICTION TORQUE)
T2 FRICTION TORQUE (SECOND FRICTION TORQUE)
T3 FRICTION TORQUE (THIRD FRICTION TORQUE)
100 DAMPER DEVICE
Ax ROTATION CENTER
δ GAP

The invention claimed is:

1. A damper device comprising:
a first member rotatable about a rotation center;
a second member rotatable about the rotation center;
a third member configured to be rotatable about the rotation center and integrally rotate with the first member in a first torsion angle range of the damper device and integrally rotate with the second member in a second torsion angle range of the damper device;
a first resilient member that resiliently expands and contracts along with relative rotation of the first member and the second member about the rotation center;
a first friction member having a first friction face that generates a friction torque along with the relative rotation of the first member and the second member; and
a second friction member having a second friction face that generates a friction torque along with relative rotation of the second member and the third member, wherein
one of the first member and the third member is provided with a hook, and in the first torsion angle range of the damper device the hook circumferentially catches the other of the first member and the third member to integrally rotate the first member and the third member, and
in the second torsion angle range of the damper device, the hook does not circumferentially catch the other of the first member and the third member, and the second member and the third member are integrally rotated by a frictional force between the second member and the third member.

2. The damper device according to claim 1, further comprising a second resilient member that presses the second member and the third member onto the second friction face.

3. The damper device according to claim 1, wherein the first friction member further has a third friction face that generates a friction torque along with relative rotation of the second member and the third member.

4. The damper device according to claim 3, further comprising a second resilient member that presses the second member and the third member onto the second friction face, wherein
the second resilient member further presses the second member and the third member onto the third friction face.

5. A damper device comprising:
a first member rotatable about a rotation center;
a second member rotatable about the rotation center;
a third member configured to be rotatable about the rotation center and rotate integrally with the first member in a first torsion angle range of the damper device and rotate integrally with the second member in a second torsion angle range of the damper device;
a fourth member configured to be rotatable about the rotation center relative to the integrally rotated first member, second member, and third member in a third torsion angle range of the damper device, the second torsional angle range being greater than the third torsional angle range and less than the first torsion angle range;
a first resilient member that resiliently expands and contracts along with relative rotation of the first member and the second member about the rotation center;
a third resilient member that resiliently expands and contracts along with relative rotation of the second member and the fourth member about the rotation center;
a first friction member having a first friction face that generates a friction torque with the relative rotation of the first member and the second member;
a second friction member having a second friction face that generates a friction torque along with the relative rotation of the second member and the third member; and
a third friction member having a fourth friction face that generates a friction torque with the relative rotation of the first member and the fourth member.

* * * * *